C. C. HOBSON.
CANE HARVESTING APPARATUS.
APPLICATION FILED FEB. 11, 1921.
1,425,479.
Patented Aug. 8, 1922.
4 SHEETS—SHEET 4.
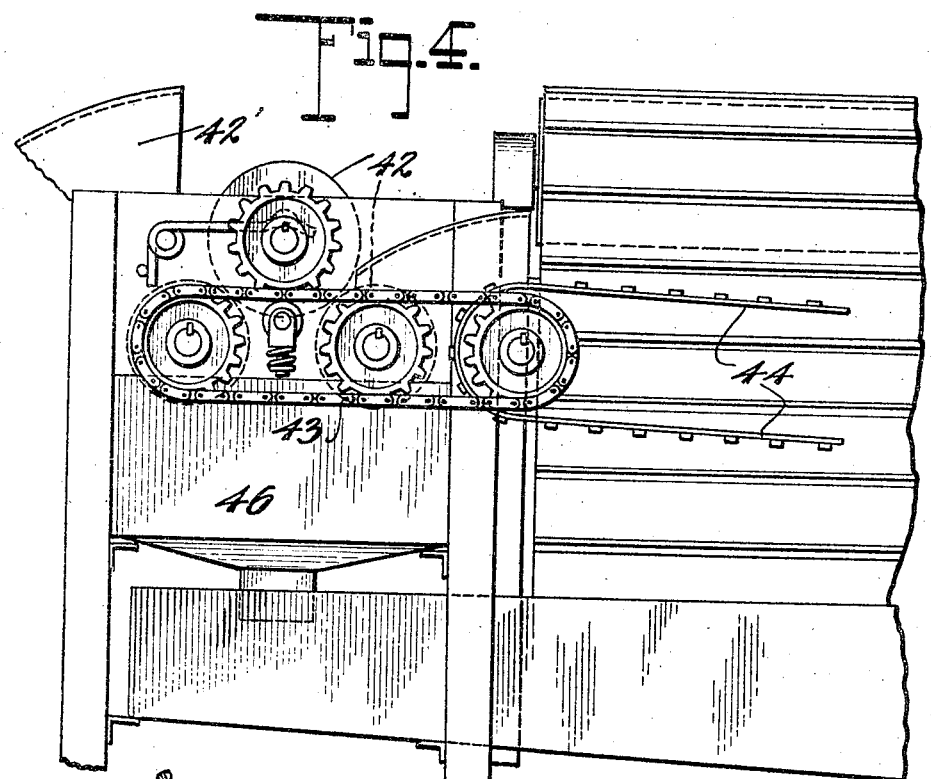
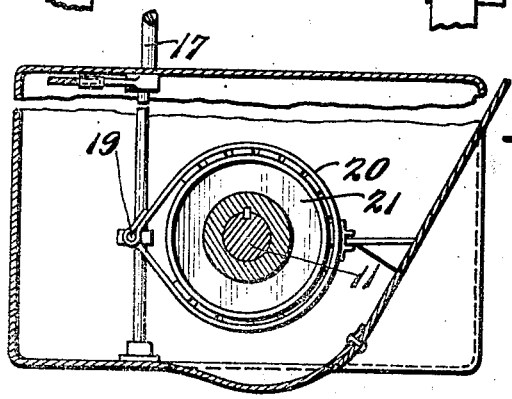
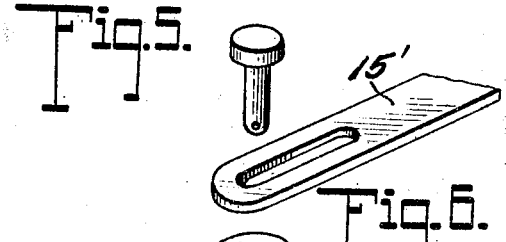
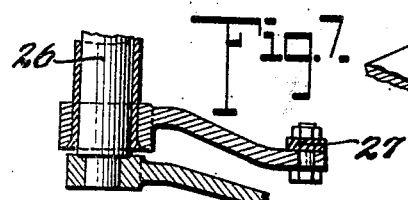
Witness:
C. H. Wagner
Inventor
Claude C. Hobson
Robb & Hill
Attorneys

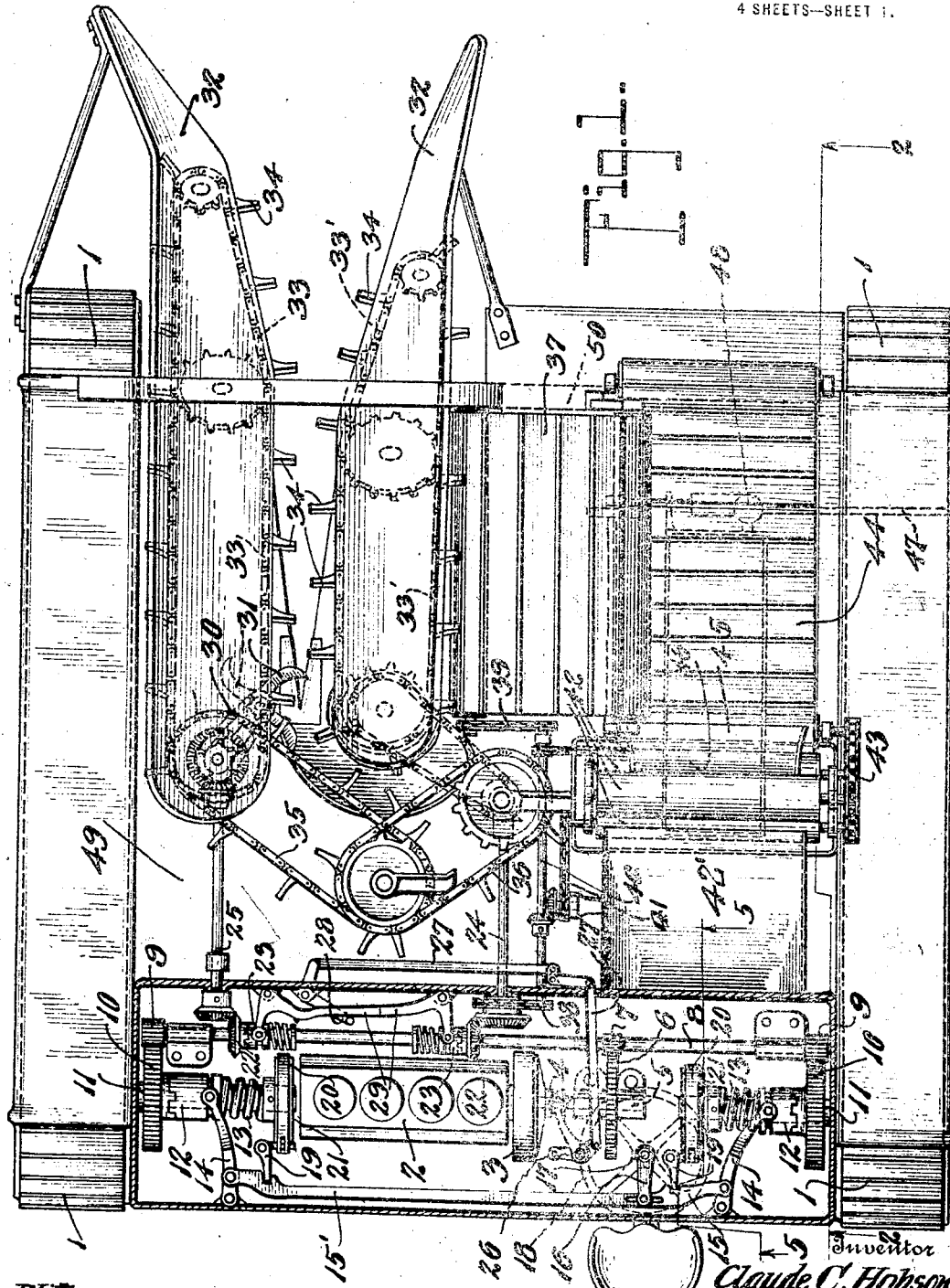

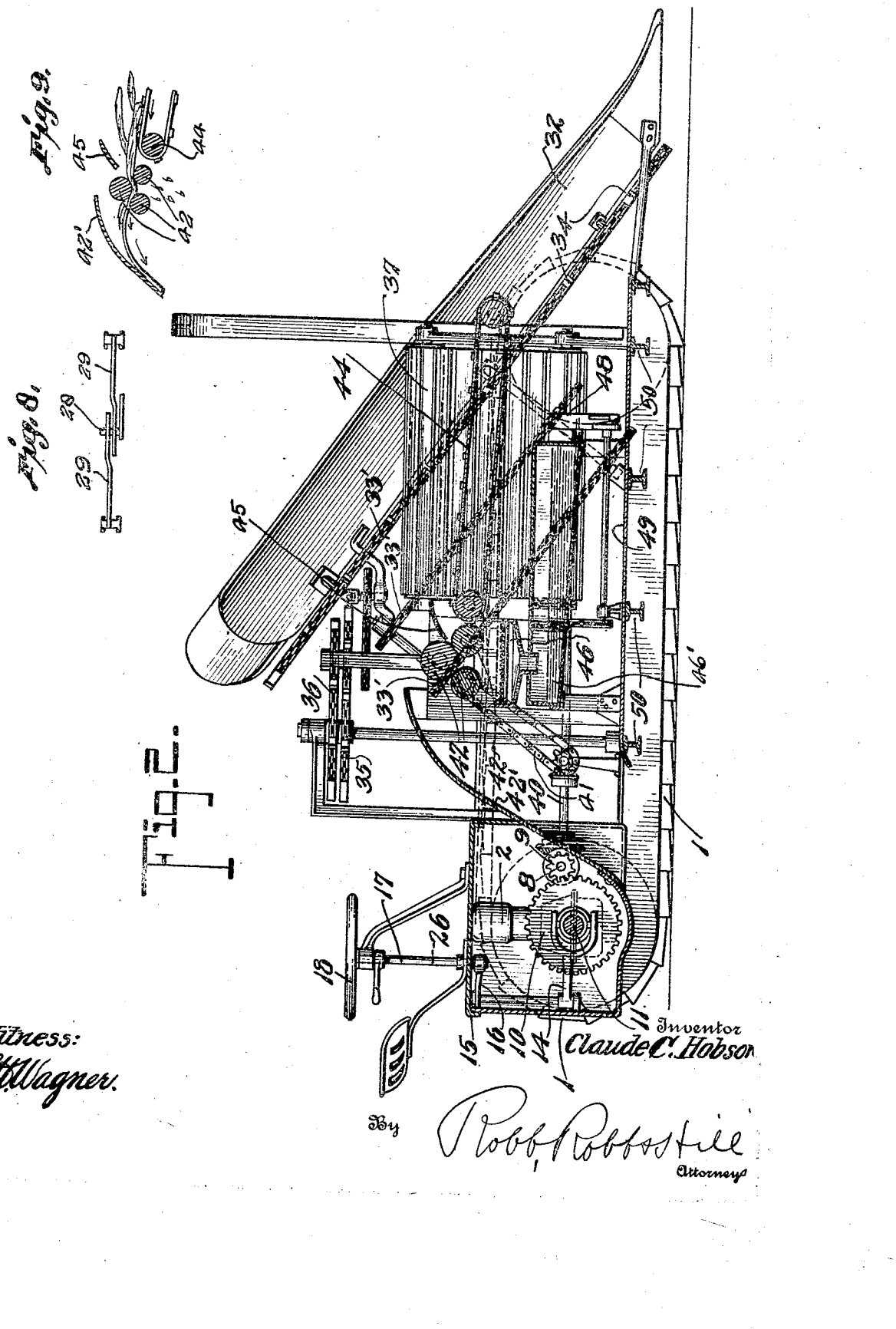

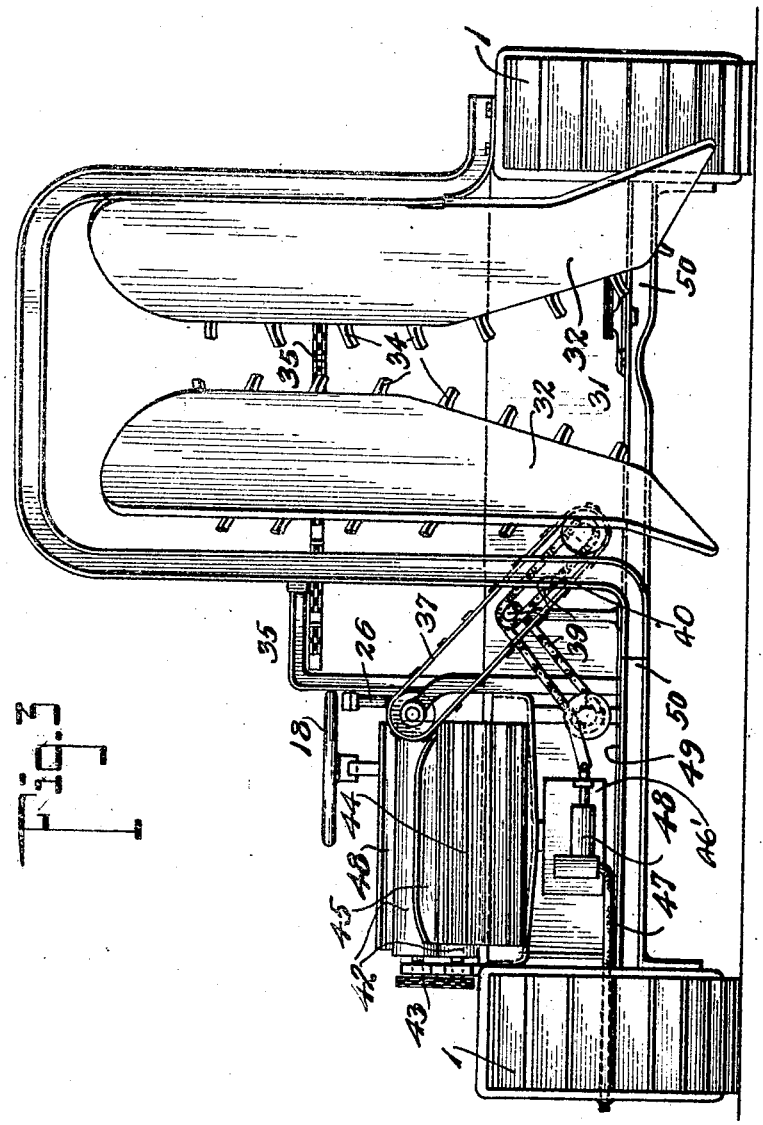

UNITED STATES PATENT OFFICE.

CLAUDE C. HOBSON, OF KENWOOD PARK, IOWA, ASSIGNOR OF ONE-HALF TO OTO O. HOBSON, OF VINTON, IOWA.

CANE-HARVESTING APPARATUS.

1,425,479. Specification of Letters Patent. Patented Aug. 8, 1922.

Application filed February 11, 1921. Serial No. 444,140.

*To all whom it may concern:*

Be it known that I, CLAUDE C. HOBSON, a citizen of the United States, residing at Kenwood Park, in the county of Linn and State of Iowa, have invented certain new and useful Improvements in Cane-Harvesting Apparatus, of which the following is a specification.

The present invention has for its primary object to provide a unitary mechanism for performing in the field at one operation the complete harvesting and extraction of the juices from sugar cane in order to eliminate the laborious and unnecessary work of duplication of operations which is usual incident to the steps customarily followed at this time.

In the agricultural pursuit to which this invention is adapted, it is conventionally the practice, when the cane crop is ripe or in proper condition, to first cut down the stalks, either by hand labor or by means of harvesting machinery suited for this work, after which the stalks are loaded upon vehicles and removed from the field to a place from which they may later be taken to the crushing mill or they may on the other hand be hauled directly to such mill. Then by another handling they are passed through said mill, the juice extracted, and finally the bagasse is subsequently disposed of, or, as not unusual, hauled out upon the field again where it is allowed to rot and improve the land in the usual manner.

With the scarcity of labor, so many handlings of the cane cause heavy expense and therefore my aim has been to provide an apparatus wherein the extraction of the juices may be effected as a part of the harvesting operation and at the same time the bagasse is discharged and evenly spread upon the field where it may most advantageously benefit the land.

To this end I have devised a harvesting machine of this class in which is combined means for cutting the stalks, for gathering and conveying the same to suitable means for expressing the juices as the apparatus is advanced over the field. My invention is characterized by the provision of novel means for this purpose including gathering mechanism arranged to carry the stalks in upright position and to move the same laterally after cutting to deposit them in prone position upon a laterally moving elevating conveyor which carries the stalks to the feeding means arranged in proper relation to pressing rolls from which the bagasse is discharged upon the ground, while the juices are delivered into a suitable reservoir forming a part of the apparatus.

These and such other objects as may hereinafter appear are attained by the novel construction, combination and arrangement of parts to be hereinafter specifically described and claimed. Reference will now be had to the accompanying drawings forming a part of this specification, wherein:

Figure 1 is a top plan view of the apparatus constructed in accordance with my invention.

Figure 2 is a sectional view taken about on the plane indicated by the line 2—2 of Figure 1.

Figure 3 is a front elevation of the apparatus.

Figure 4 is an enlarged detail view showing more clearly the driving connections for the pressing rolls and the feeding apron.

Figure 5 is a sectional view on the line 5—5 of Figure 1 and showing more clearly the brake construction for steering purposes.

Figure 6 is an enlarged detail view of certain of the parts employed for clutching and de-clutching the tractor tread elements.

Figure 7 is a sectional view of the clutch operating rod for the engine clutch and the connections leading to the clutch devices for the harvesting mechanisms.

Figure 8 is a detail fragmentary view showing more clearly certain clutch operating means employed.

Figure 9 is a diagrammatic view of a stalk passing through the pressing rolls.

Throughout the following detailed description of the several figures of the drawings, similar parts are referred to by like reference characters.

In the drawings I have illustrated an embodiment of the mechanism which is devised for carrying out the various steps hereinbefore referred to but I desire it to be particularly understood that the details of the mechanisms may readily be modified to suit the purposes without in any wise departing from the spirit of my invention. I preferably mount the mechanism upon a motor driven vehicle which will operate under its own power over the field of the cane crop, said vehicular device comprising the endless treads 1 suitably mounted upon a frame support which carries the prime mover 2 of any desired construction. The motor is operatively connected to the various mechanisms of this apparatus as well as to the tractor treads so that the same motive power is employed to actuate the series of mechanisms according to the desires of the operator. The engine shaft carries the usual fly wheel 3 which by means of the clutch 4 is operatively connected to shaft 5 carrying drive gear 6 which meshes with the pinion 7 mounted upon a transverse counter-shaft 8. The shaft 8 in turn through the pinions 9 at each end actuates the loose gears 10 mounted upon the shafts 11 through which the drive may be imparted to the tractor treads. Adjacent each gear 10 is a clutch element 12 splined upon the shaft 11 and normally held in clutched relation to the gear 10 by means of a spring 13. The clutch element may be disengaged from the gear 10 to interrupt transmission of power to the tread member by means of the arm 14 which is operatively connected to the link 15, the latter in turn being connected to a shifting arm 16 carried at the end of the steering wheel shaft 17. The parts referred to are obviously duplicated at the opposite side so that corresponding actuation of the tractor treads will be effected. It should be understood that this connection to the opposite side is through the relatively long link 15' and this duplication of mechanism is employed in order that an independent drive of the tractor treads may be had for the purposes of steering the apparatus as it advances to its work. Hence, shifting of the arm 16 in one direction by means of the steering wheel 18 will de-clutch the tractor tread at one side and through the instrumentality of the bell crank 19 the brake 20 will be applied to its brake drum 21 mounted upon the inner end of the shaft 11. This disconnects and brakes the motion of the tractor tread as stated at one side while the power applied at the other side causes the vehicle to turn. Shifting of the arm 16 in the other direction will accomplish just the reverse of the foregoing, that is to say, allowing the power to be transmitted to the previously inactive tractor tread while through the link connection 15' the opposite tractor tread is disconnected to permit of the vehicle turning in the opposite direction. Motion is imparted to the instrumentalities which will now be described from the countershaft 8 which carries spaced gears 22 with which clutch elements 23 coact, said gears 22 transmitting motion on the one nd to the shaft 24 and on the other hand to the shaft 25.

Motion to these shafts 24 and 25 may be discontinued by the operation of a throwout lever or rod 26 which actuates through the links 27 the knock-out arm 28 coacting with corresponding superposed bell crank arms 29, 29 connected operatively with the clutch elements 23 of conventional form, as shown in Figures 1 and 8.

The shaft 25 is operatively connected with the chain 30 which actuates the stalk cutter 31 of special form comprising a series of arcuate and radially extending knife elements arranged at a point substantially adjacent to the apex of the throat of the gathering boards or guide boards 32 of conventional type. This shaft also actuates the gathering chains 33 at one side, said chains being provided with the customary form of spaced lugs 34.

The shaft 24 is likewise connected operatively to drive the opposing gathering chains 33' and the shorter chains 35, 36, by means of which the stalks are gathered and directed to the cutter, and subsequently turned laterally and discharged from the passage between the gathering boards so as to fall into prone position upon an elevating apron or conveyor 37.

The apron 37 is driven from the shaft 24 by the chains 38, 39 and the shaft 40. The latter shaft is also utilized to transmit motion through the chain connection 41 to a series of pressing rollers 42 and the feeding conveyor 44 is actuated by the chain 43. To be more strictly accurate, it will be observed that the chain 41 drives one of the pressing rollers 42 only, while the others are driven by the chain 43 which is also the actuating means for the conveyor 44 as stated.

At this point it is desirable to explain the cycle of operation of the apparatus. As the machine is advanced over the field in a proper manner to allow the stalks of cane in a single row to come between the gathering boards, those stalks which are down or bent out of alinement, are picked up into upright position and carried in such position rearwardly, relatively speaking, to the rotary cutter at the apex of the throat, where the stalks are severed. The stalks from this point are conveyed laterally and discharged, as hereinbefore indicated, upon the elevating apron 37 which carries the stalks in horizontal position upwardly to the feeding conveyor 44. The stalks are now shifted in a longitudinal direction toward the pressing rollers 42 and guided between said rollers by the shield 45. The juice, under the proper tension of the rollers, is pressed from the stalks and falls into the open, shallow pan 46 directly beneath said rollers, this pan preferably having a suitable screen so as to separate foreign matter which accidentally drops into the receptacle from the extracted juices. The juice then passes into a reservoir arranged at a lower elevation and capable of holding a suitable quantity by virtue of its size. Where the amount of extracted juices is likely to exceed the capacity of the reservoir in the particular operation, I contemplate that a suitable vehicle (not shown) may be driven along beside the harvesting apparatus or such vehicle may be drawn by the harvesting apparatus itself and the vehicle will embody a tank to receive the juices from the reservoir 46′ through the flexible conduit 47, being pumped from the said reservoir by a proper pump device arranged at one end as indicated at 48.

The auxiliary vehicle referred to will then take the juices to the place for disposition in the evaporating pans for completion of the operation of extracting the sugar content. As the bagasse passes from the pressing rollers 42 it is directed by means of the deflector 42′ downwardly upon the ground.

One of the advantageous features of this apparatus lies in the fact that I contemplate the mounting of the special mechanisms for gathering, cutting, conveying and pressing the cane upon a platform 49 which is supported upon the cross frame pieces 50 so that these mechanisms may be bodily removed from the frame to permit the tractor vehicle to be utilized for other purposes than the special harvesting operation hereinbefore set forth.

I am aware that certain of the operations which have been described with reference to the harvesting of the cane have heretofore been carried out by machinery for this purpose but I believe that I am the first to devise an apparatus of the class which is capable of performing the complete operation to the extraction of the juices from the cane stalks and accordingly, I believe further that I am entitled to the protection of the broad scope which covers this idea.

What is claimed is:

1. In an apparatus for extracting juices from the cane, the combination of a support adapted to be advanced over the field, cane cutting mechanism mounted thereupon, and means mounted upon the support and adjacent thereto for pressing and thereby extracting the juices from the cane subsequent to the cutting operation.

2. In an agricultural apparatus of the class described, the combination of a stalk cutter, gathering mechanism for moving the stalks to the cutter, and means arranged in position to receive and press to thereby express the juices from the stalks subsequent to the cutting operation.

3. In an agricultural implement of the class described, the combination of a support adapted to be advanced over the field, a cutter for severing the stalks adjacent to the ground, means for pressing the stalks and thereby extracting the juices therefrom, and means intermediate the pressing means and the cutter for conveying the stalks to the former.

4. In a unitary agricultural implement of the class described, the combination of a tractor support adapted to be advanced over the field, a cutter for severing the stalks adjacent to the ground, mechanism for gathering the stalks and moving the same in upright position to the cutter, said means directing the stalks laterally therefrom, elevating means, and pressing mechanism to which the elevating means direct the stalks.

5. In a unitary harvesting machine of the class described, the combination of a support adapted to be advanced over the field, a cutter for severing the stalks adjacent to the ground, mechanism for gathering the stalks and moving the same in upright position to the cutter, elevating means, feeding mechanism adapted to receive the stalks from the elevating means, and pressing mechanism to which said feeding means directs the stalks for extraction of their juices.

6. In a machine of the class described, the combination of gathering chains engageable with the cane stalks, a cutter device adapted to sever the cane adjacent to the ground, an elevating conveyor arranged at one side of the said chains, pressing rolls disposed to receive the cane from the elevating conveyor, and means for directing the cane when cut laterally of the gathering chains to drop the same upon the conveyor aforesaid.

7. In an agricultural implement of the class described adapted for extracting juices from cane or the like, the combination of a tractor support adapted to be advanced over the field, cane cutting mechanism mounted thereupon, means adjacent thereto for pressing the cane and thereby extracting the juices from the cane subsequent to the cutting operation, and a container mounted upon the support to receive said juices.

8. In an agricultural implement of the class described adapted for extracting juices from cane or the like, the combination of a tractor support adapted to be advanced over the field, cane harvesting mechanism mounted thereupon, means adjacent thereto for pressing the cane and thereby extracting the juices from the cane subsequent to the harvesting operation, a container mounted on the support to receive said juices, and a reservoir on said support into which the juices are directed from the container aforesaid.

9. In an agricultural implement of the class described adapted for extracting juices from cane or the like, the combination of a tractor support adapted to be advanced over the field, cane harvesting mechanism mounted thereupon, means adjacent thereto for pressing and thereby extracting the juices from the cane subsequent to the harvesting operation, a container on the support to receive said juices, and means operable to transfer the juices from the container.

10. In an agricultural implement of the class described, the combination with a tractor frame having endless tread elements and a prime mover therefor, of cane harvesting mechanism arranged at the forward portion of said frame including gathering chains for engaging the cane and holding it in upright position, a rotary cutter adapted to sever the cane adjacent to the ground, other chains for moving the cane when cut laterally of the first mentioned gathering chains, an elevating conveyor upon which the cane is dropped into prone position, a feeding conveyor arranged at the end of the elevating conveyor for directing the cane longitudinally of the frame, pressing rolls for extracting the juices from the cane, means for guiding the cane into said pressing rolls, a reservoir on the support to receive the expressed juices, and a pump device for transferring the said juices from said reservoir at will.

In testimony whereof I affix my signature.

CLAUDE C. HOBSON.